US010957172B2

(12) United States Patent
Lee (10) Patent No.: US 10,957,172 B2
(45) Date of Patent: Mar. 23, 2021

(54) INTERNET PROTOCOL CAMERA SECURITY SYSTEM ALLOWING SECURE ENCRYPTION INFORMATION TO BE TRANSMITTED (71) Applicant: IDIS CO., LTD., Daejeon-si (KR)

(72) Inventor: Sang Hoon Lee, Seoul (KR)

(73) Assignee: IDIS CO., LTD., Daejeon-si (KR)

( * ) Notice: Subject to any disclaimer, the term of this patent is extended or adjusted under 35 U.S.C. 154(b) by 0 days.

(21) Appl. No.: 16/774,167

(22) Filed: Jan. 28, 2020

(65) Prior Publication Data
US 2020/0242903 A1 Jul. 30, 2020

(30) Foreign Application Priority Data

Jan. 29, 2019 (KR) .................. 10-2019-0011119

(51) Int. Cl.
G08B 13/196 (2006.01)
H04L 29/06 (2006.01)

(52) U.S. Cl.
CPC . G08B 13/19667 (2013.01); G08B 13/19656 (2013.01); H04L 63/0435 (2013.01); H04L 63/0485 (2013.01); H04L 63/166 (2013.01)

(58) Field of Classification Search
CPC ........ G08B 13/19667; G08B 13/19656; H04L 63/0435; H04L 63/166; H04L 63/0485
See application file for complete search history.

(56) References Cited

U.S. PATENT DOCUMENTS

| 8,780,199 B2* | 7/2014 | Mimar | G08B 13/19676 348/143 |
| 2007/0297607 A1* | 12/2007 | Ogura | H04N 7/1675 380/239 |
| 2010/0064138 A1* | 3/2010 | Hwang | H04L 63/045 713/168 |
| 2017/0064408 A1* | 3/2017 | Ketola | H04N 21/2347 |
| 2017/0323542 A1* | 11/2017 | Koh | H04N 7/181 |
| 2018/0331824 A1* | 11/2018 | Racz | G08B 13/196 |
| 2019/0097805 A1* | 3/2019 | Shin | H04L 9/3271 |
| 2019/0238795 A1* | 8/2019 | Chen | H04N 21/63345 |

FOREIGN PATENT DOCUMENTS

| KR | 10-1760095 B1 | 7/2017 |
| KR | 10-1815467 B1 | 1/2018 |
| KR | 10-1837188 B1 | 3/2018 |
| KR | 10-2017-0089747 A1 | 8/2018 |

OTHER PUBLICATIONS

The European Search Report dated Mar. 23, 2020 for European Application No. 20152844.5.

* cited by examiner

Primary Examiner — Richard A Hansell, Jr.

(57) ABSTRACT

An IP camera security system allowing secure encryption information to be transmitted is provided that is implemented such that an encryption key and an encryption method are managed not by an IP camera and a client terminal vulnerable to security but by an image storage device having robust security so as to further secure the network segment security.

5 Claims, 4 Drawing Sheets

INTERNET PROTOCOL CAMERA SECURITY SYSTEM ALLOWING SECURE ENCRYPTION INFORMATION TO BE TRANSMITTED

CROSS-REFERENCE TO RELATED APPLICATION(S)

This application claims priority from Korean Patent Application No. 10-2019-0011119, filed on Jan. 29, 2019, in the Korean Intellectual Property Office, the disclosure of which is incorporated herein by reference in its entirety.

BACKGROUND

1. Field

The following description relates to an video security technology, and more specifically, to an internet protocol (IP) camera security system allowing secure encryption information to be transmitted.

2. Description of Related Art

In general, internet protocol (IP) cameras are connected to image storage devices, such as network video recorders (NVRs), video management systems (VMSs), and the like via networks, and image data captured by the IP cameras is stored in the image storage devices. In most cases, the image data is stored without being encrypted due to the performance issues. Stand-alone NVRs are being released as a product having 4 to 64 channels or more but have difficulty in encrypting and storing high-definition image data of Full High Definition (HD) or higher resolution.

The VMS having less H/W constraint than with the NVR may support functioning by increasing H/W performance, but the performance increase is costly. In recent years, security of networks is increasingly being tightened such that the network session is encrypted with transport layer security (TLS). However, TLS encryption requires a high level of performance, and when TLS encryption for transmitting and receiving an image and TLS decryption and encryption for storing the encrypted image are both performed, the performance of the image storage device is significantly lowered.

Figure 1:
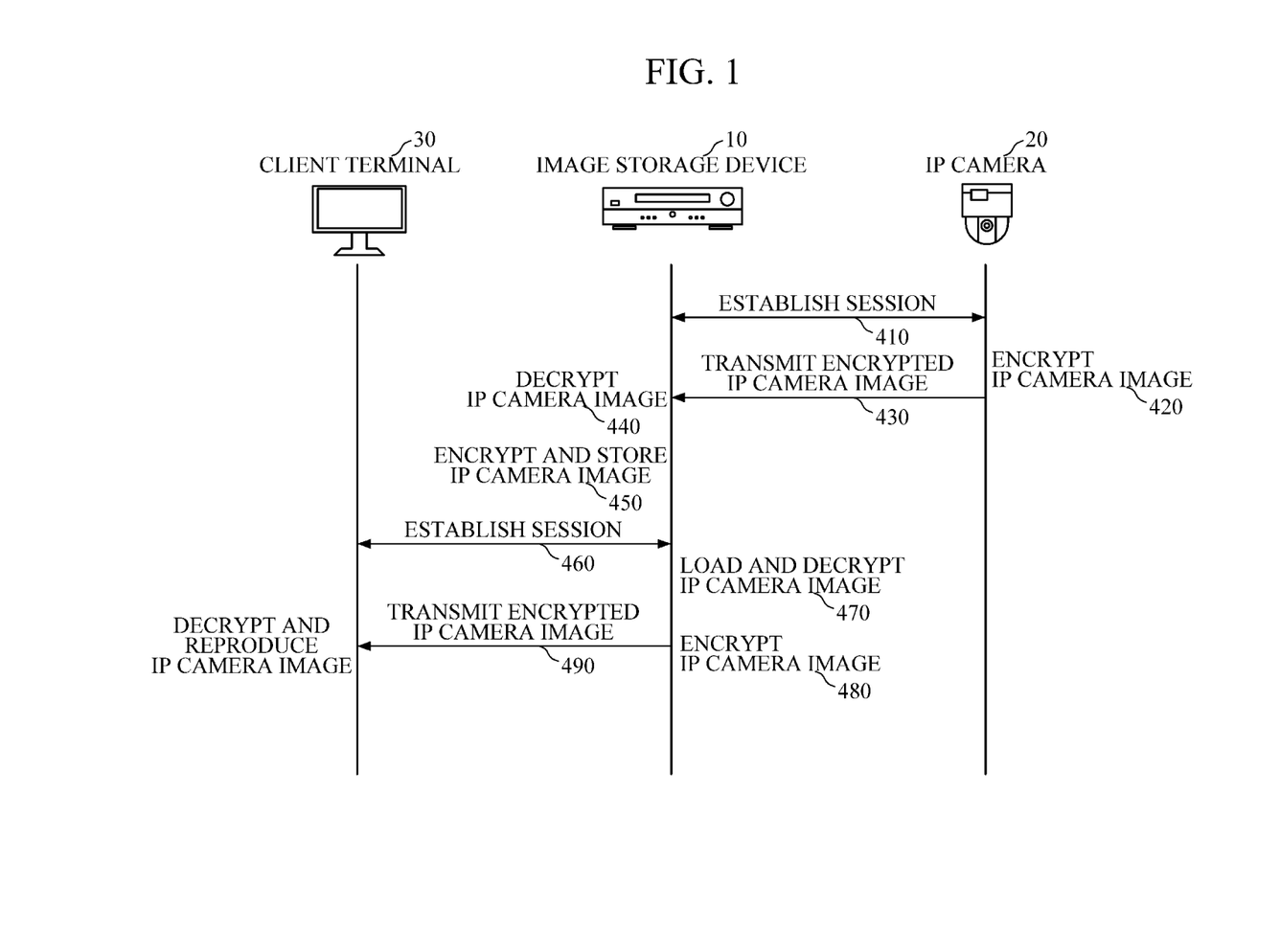
FIG. 1 is a flowchart showing an IP camera image encryption and transmission process in a conventional IP camera security system allowing secure encryption information to be transmitted.

FIG. 1 is a flowchart showing an IP camera image encryption and transmission process in a conventional IP camera security system allowing secure encryption information to be transmitted. When a session between an image storage device 10 and an IP camera 20 is established (410), the IP camera 20 encrypts an IP camera image captured by the IP camera 20 using a first encryption key possessed by the IP camera 20 and transmits the encrypted image to the image storage device 10 (430).

Then, the image storage device 10 decrypts the encrypted IP camera image received from the IP camera 20 using a first decryption key (a decryption key corresponding to the first encryption key possessed by the IP camera 10) (440). In order for the image storage device 10 to store the decrypted IP camera image, the image storage device 10 encrypts the decrypted IP camera image using a second encryption key possessed by the image storage device 10 and stores the encrypted IP camera image (450).

When a session between the image storage device 10 and a client terminal 30 is established according to a request of the client terminal 30 for transmission of the IP camera image (460), the image storage device 10 loads the IP camera image encrypted and stored therein and decrypts the loaded IP camera image using a second decryption key (a decryption key corresponding to the second encryption key) (470).

Then, the image storage device 10 encrypts the decrypted IP camera image using a third encryption key possessed by the image storage device 10 (480) and transmits the encrypted IP camera image to the client terminal 30 (490). Then, the client terminal 30 which has received the encrypted IP camera image from the image storage device 10 decrypts the encrypted IP camera image using a third decryption key (a decryption key corresponding to the third encryption key) and reproduces the decrypted IP camera image.

However, such a conventional IP camera security system allowing secure encryption information to be transmitted has a structure in which reproduction of an IP camera image on the client terminal requires a total of three encryptions and three decryptions including two encryptions and two decryptions for transmitting and receiving the IP camera image, and one encryption and one decryption for storing and loading the IP camera image.

In this case, the image storage device 10 needs to perform a total of two encryptions and two decryptions including one encryption and one decryption for IP camera image transmission and reception, and one encryption and one decryption for IP camera image storage and loading which causes the performance of the image storage device 10 to be significantly lowered.

There is a technology proposed in Korean Registered Patent No. 10-1760095 (Jul. 14, 2017) in which an IP camera encrypts an image captured by the IP camera using an encryption key generated from a hardware security module (HSM) embedded in the IP camera, the IP camera transmits the encrypted capture image to an NVR together with index information of the encryption key, the NVR which has received the encrypted capture image and the index information of the encryption key transmits the received encrypted capture image and the index information of the encryption key to a client terminal, and the client terminal which has received the encrypted capture image and the index information of the encryption key generates a decryption key through a HSM embedded in the client terminal and decrypts the encrypted capture image using the generated decryption key.

However, such a technology allows the encryption key and the decryption key to be managed in the IP camera and the client terminal, respectively, which are vulnerable to security, and thus has a security weakness. Accordingly, the present inventor has conducted studies concerning an IP camera security system allowing secure encryption information to be transmitted that is implemented such that an encryption key and an encryption method are managed not by an IP camera and a client terminal vulnerable to security but by an image storage device having robust security.

RELATED ART DOCUMENT

Patent Document (Patent Document 1):
Korean Registered Patent No. 10-1760095 (Jul. 14, 2017)

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to an IP camera security system allowing secure encryption information to be transmitted that is implemented such that an encryption key and an encryption method are managed not by an IP camera and a client terminal vulnerable to security but by an image storage device having robust security.

The following description relates to an IP camera security system allowing secure encryption information to be transmitted in which an encryption key and an encryption method are transmitted through a security session separated from a data transport session for transmitting an encrypted image such that secure transmission of encryption information is achieved.

The following description relates to an IP camera security system allowing secure encryption information to be transmitted in which an image storage device does not perform encryption and decryption, thereby preventing the performance of the image storage device from being degraded.

In one general aspect, an internet protocol (IP) camera security system allowing secure encryption information to be transmitted includes: a plurality of IP cameras configured to capture a surveillance zone-specific IP camera image; at least one image storage device selectively connected to the plurality of IP cameras by a network and configured to receive and store the surveillance zone-specific IP camera image captured by each of the plurality of IP cameras; and at least one client terminal connected to the at least one image storage device by a network and configured to receive and reproduce the surveillance zone-specific IP camera images stored in the image storage device, wherein the image storage device transmits a unique encryption key of the image storage device and an encryption method to the plurality of IP cameras selectively connected to the image storage device by the network and the at least one client terminal such that an encryption key and an encryption method are managed not by the IP camera and the client terminal vulnerable to security but by the image storage device having robust security.

The image storage device may include a memory in which the unique encryption key of the image storage device and the encryption method are stored, a controller configured to establish a session to the IP camera or the client terminal, an encryption information transmitter configured to transmit the unique encryption key of the image storage device and the encryption method stored in the memory to the IP camera or the client terminal, to which the session is established, through a security session, an encrypted data receiver configured to receive the IP camera image encrypted using the unique encryption key of the image storage device and the encryption method transmitted by the encryption information transmitter from the IP camera through a data transport session, and an encrypted data storage controller by which the encrypted IP camera image received through the encrypted data receiver is stored in the memory without being decrypted.

The image storage device may further include an encrypted data transmitter configured to transmit the encrypted IP camera image stored in the memory without being decrypted to the client terminal through a data transport session such that the client terminal decrypts the encrypted IP camera image using the unique encryption key of the image storage device and the encryption method transmitted by the encryption information transmitter.

The IP camera may discard the unique encryption key of the image storage device and the encryption method received from the image storage device when the session established to the image storage device is terminated.

The client terminal may discard the unique encryption key of the image storage device and the encryption method received from the image storage device when the session established to the image storage device is terminated.

The encryption information transmitter may negotiate the encryption method with the IP camera through a transport layer security (TLS) session.

The encryption method may include one of a full encryption method, a partial encryption method, and a network abstraction layer (NAL) unit encryption method.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, exemplary embodiments of the present disclosure will be described in detail with reference to the accompanying drawings so that one skilled in the field of the present disclosure might advantageously implement the spirit of the disclosure. Although specific embodiments thereof are shown by way of example in the accompanying drawings and will be described, it should be understood that there is no intention to limit the present disclosure to the particular embodiments disclosed.

In the description of the embodiments, a detailed description of related known functions or constructions will be omitted to avoid obscuring the subject matter of the present disclosure.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

Figure 2:
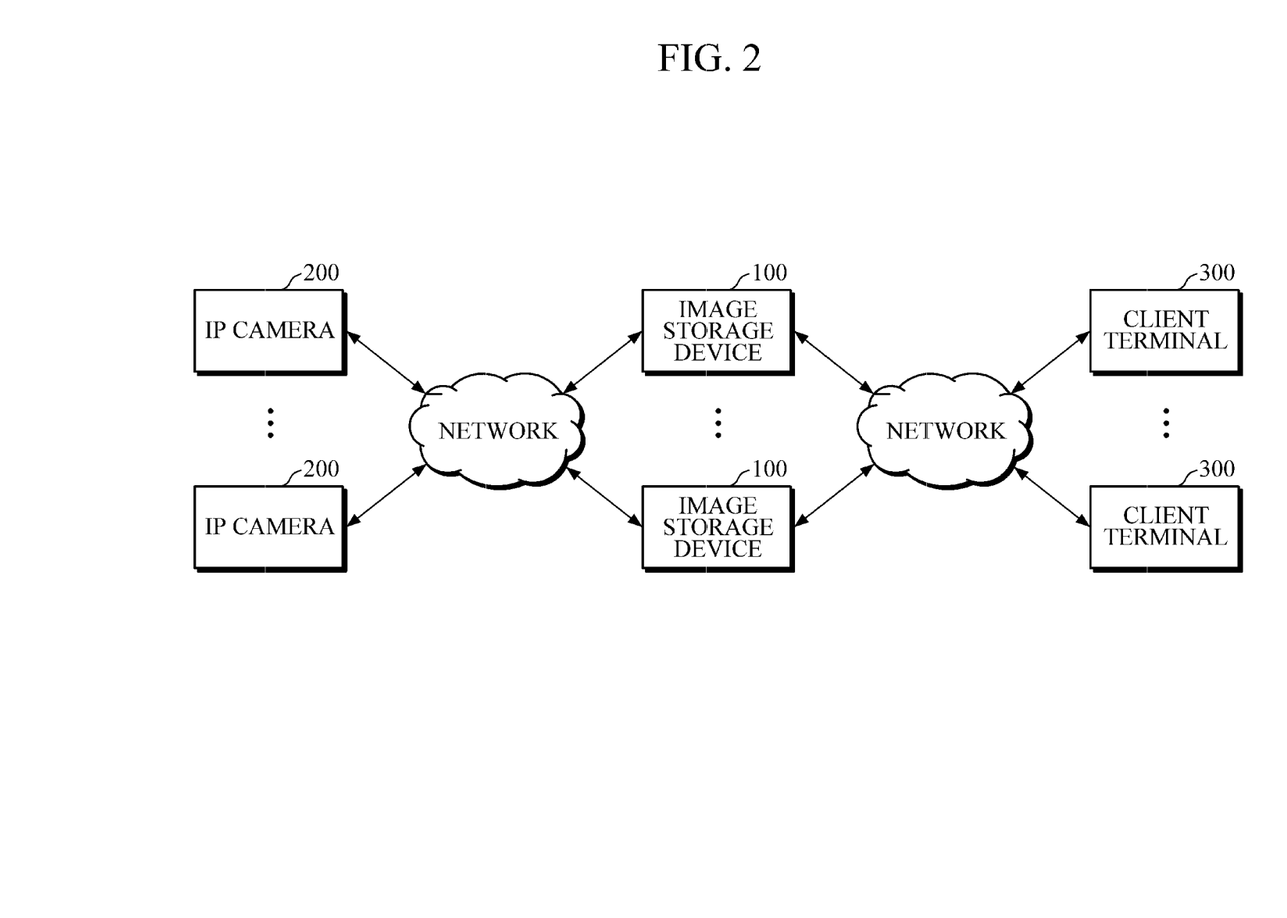
FIG. 2 is a schematic diagram illustrating an IP camera security system allowing secure encryption information to be transmitted according to the present disclosure.

FIG. 2 is a schematic diagram illustrating an internet protocol (IP) camera security system allowing secure encryption information to be transmitted according to the present disclosure. Referring to FIG. 2, the IP camera security system allowing secure encryption information to be transmitted includes at least one image storage device 100, a plurality of IP cameras 200, and at least one client terminal 300.

The at least one image storage device 100 is selectively connected to the plurality of IP cameras 200 through a network and receives surveillance zone-specific IP camera images captured by each of the plurality of IP cameras 200 and store the received surveillance zone-specific IP camera images. For example, the image storage device 100 may include a network video recorder (NVR), a video management system (VMS), or the like.

The plurality of IP cameras 200 is selectively connected to the at least one image storage device 100 and each captures an image of a surveillance zone monitored by the IP camera 200 and transmits the captured surveillance zone-specific IP camera image to the at least one image storage device 100 connected through the network.

In this case, each of the IP cameras 200 may be provided with a microphone embedded therein to receive speech of a surveillance zone monitored by the IP camera 200 and transmit the speech together with an image of the surveillance zone captured by the IP camera 200 to the image storage device 100 connected thereto by the network.

The at least one client terminal 300 is connected to the image storage device 100 through a network, requests transmission of surveillance zone-specific IP camera images to the image storage device 100, receives the surveillance zone-specific IP camera images stored in the image storage device 100, and reproduces the received surveillance zone-specific IP camera images.

For example, the client terminal 300 may include a control server, a user personal computer (PC), a smartphone, or the like that may be connected to the image storage device 100 through a wired or wireless network to receive surveillance zone-specific IP camera images stored in the image storage device 100 and reproduce the received surveillance zone-specific IP camera images. However, the client terminal 300 according to the present disclosure is not limited thereto.

The at least one image storage device 100 of the IP camera security system allowing secure encryption information to be transmitted according to the present disclosure is implemented to transmit a unique encryption key of the image storage device and an encryption method to the plurality of IP cameras 200 selectively connected thereto and the at least one client terminal 300 such that an encryption key and an encryption method are managed not by the IP camera 200 and the client terminal 300 vulnerable to security but by the image storage device 100s having robust security.

Figure 3:
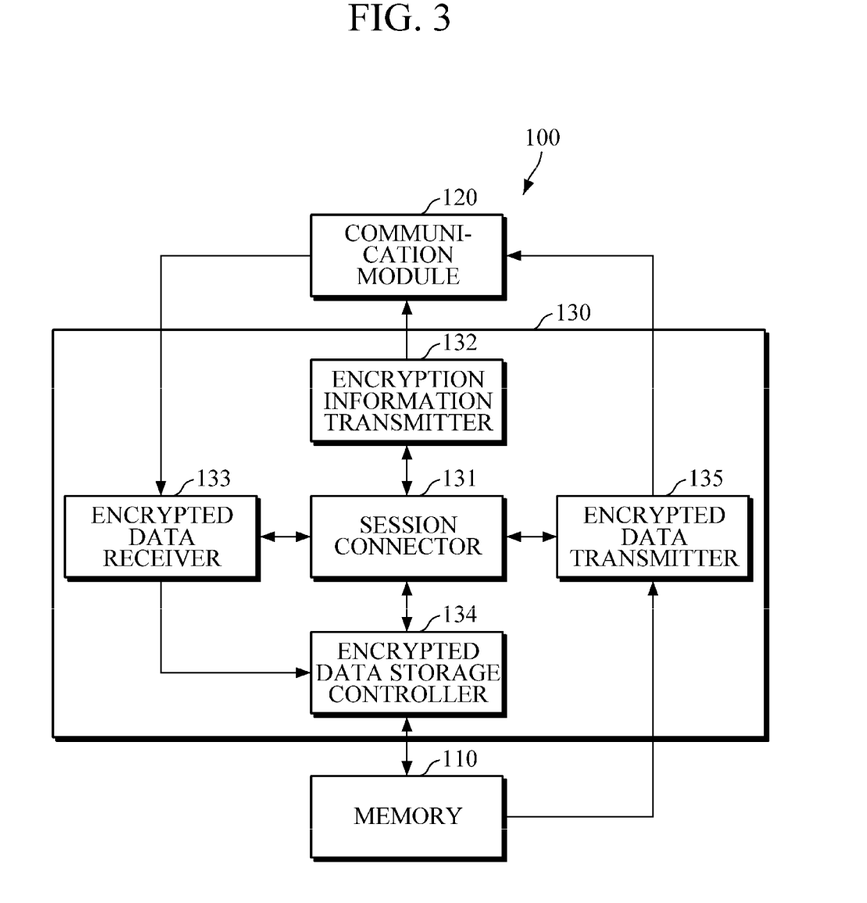
FIG. 3 is a block diagram illustrating a configuration of an image storage device of an IP camera security system allowing secure encryption information to be transmitted according to an embodiment of the present disclosure.

FIG. 3 is a block diagram illustrating a configuration of the image storage device 100 of the IP camera security system allowing secure encryption information to be transmitted according to an embodiment of the present disclosure. Referring to FIG. 3, the image storage device 100 of the IP camera security system allowing secure encryption information to be transmitted according to the present disclosure includes a memory 110, a communication module 120, and a processor 130 as hardware components and includes an IP camera security program to be executed by the processor 130 as a software component. In this case, the IP camera security program codes may be recorded in the memory 110.

The memory 110 stores the unique encryption key of the image storage device and the unique encryption method. The unique encryption key of the image storage device stored in the memory 110 is an encryption key different from encryption keys of other image storage devices. In this case, the memory 110 may be a nonvolatile memory, such as a flash memory, an electrically erasable and programmable read only memory (EEPROM), or the like, and may be implemented in the form of a hard disk drive (HDD), a solid-state drive (SSD), a micro SD, or the like but is not limited thereto.

Meanwhile, the unique encryption key of the image storage device may be a symmetric key based encryption key used for encrypting and decrypting an image, and the encryption method may include one of a full encryption method for encrypting the entire image, a partial encryption method for encrypting a portion of the entire image, or an network abstraction layer (NAL) unit encryption method that performs encryption in a transmission unit of a NAL structure for data transport of an H.264 codec, but the encryption method is not limited thereto.

The communication module 120 is individually connected to the plurality of IP cameras 200 and the at least one client terminal 300 by communication. For example, the communication module 120 may be communicatively connected to the plurality of IP cameras 200 and the at least one client terminal 300 through a wired or/and wireless IP based network.

The IP camera security program to be executed by the processor 130 includes a controller 131, an encryption information transmitter 132, an encrypted data receiver 133, and an encrypted data storage controller 134.

The controller 131 establishes a session with the IP camera 200 or the client terminal 300. For example, the controller 131 may be implemented to establish a transport layer security (TLS) session between the image storage device 100 and each of the IP camera 200 and the client terminal 300 through the communication module 120.

TLS is a standard protocol designed to ensure transport layer end-to-end security and data integrity in the process of client/server application programs communicating over a transmission control protocol (TCP)/internet protocol (IP) network.

The session established between the image storage device 100 and the IP camera 200 or the client terminal 300 by the controller 131 is divided into a security session for transmission of a unique encryption key of the image storage device and negotiation of an encryption method and a data transport session for transmission of encrypted image data.

The encryption information transmitter 132 transmits the unique encryption key of the image storage device and the encryption method, which will be stored in the memory 110, to the IP camera 200 or the client terminal 300, to which the session is established, through the security session.

In this case, the unique encryption key of the image storage device is an encryption key different from encryption keys of other image storage devices and may be a symmetric key based encryption key used for the encryption and decryption of an image.

Meanwhile, the encryption method may include one of a full encryption method for encrypting the entire image, a partial encryption method for encrypting a portion of the entire image, or a NAL unit encryption method that performs encryption in a transmission unit of a NAL structure for data transport of the H.264 codec, but the encryption method is not limited thereto.

For example, the encryption information transmitter 132 may be implemented to negotiate an encryption method with the IP camera 200 through a TLS session and transmit the unique encryption key transmission of the image storage device and the encryption method to the IP camera 200.

The IP camera 200 which has received the unique encryption key of the image storage device 100 and the encryption method from the image storage device 100 through the encryption information transmitter 132 encrypts the IP camera image of the corresponding surveillance zone using the received the unique encryption key of the image storage device 100 and the encryption method and transmits the encrypted IP camera image to the image storage device 100.

The client terminal 300 which has received the unique encryption key of the image storage device 100 and the encryption method from the image storage device 100 through the encryption information transmitter 132 decrypts the surveillance zone specific-IP camera image transmitted from the image storage device 100 using the unique encryption key of the image storage device 100 and the encrypted method.

The encrypted data receiver 133 receives the IP camera image encrypted using the unique encryption key of the image storage device and the encryption method, which are transmitted through the encryption information transmitter 132, from the IP camera 200 through the data transport session.

In this case, when the session established to the image storage device 100 is terminated, the IP camera 200 discards the unique encryption key of the image storage device and the encryption method received from the image storage device 100.

The encrypted data storage controller 134 allows the encrypted IP camera image received through the encrypted data receiver 133 to be stored in the memory 110 without being decrypted. In the conventional technology, an encrypted IP camera image received from an IP camera is decrypted by the image storage device and then is re-encrypted for storage.

However, according to the present disclosure, such a decryption and re-encryption process for storing the encrypted IP camera image is not performed so that the performance of the image storage device may be prevented from being degraded.

On the other hand, from a perspective of the IP camera, the IP camera may encrypt an IP camera image not using an encryption key possessed by the IP camera but using an encryption key and an encryption method received from the image storage device through the security session and thus may encrypt and transmit the IP camera image without degradation of the performance.

Meanwhile, according to an additional aspect of the present disclosure, the IP camera security program to be executed by the processor 130 of the image storage device 100 may further include an encrypted data transmitter 135.

The encrypted data transmitter 135 transmits the encrypted IP camera image stored in the memory 110 without being decrypted to the client terminal 300 through a data transport session such that the client terminal 300 decrypts the encrypted IP camera image using the unique encryption key of the image storage device and the encryption method transmitted by the encryption information transmitter 132.

The client terminal 300 which has received the encrypted IP camera image from the image storage device 100 through the encrypted data transmitter 135 decrypts the encrypted IP camera image using the unique encryption key of the image storage device and the encryption method transmitted by the encryption information transmitter 132 and reproduces the decrypted IP camera image.

In this case, when the session established to the image storage device 100 is terminated, the client terminal 300 discards the unique encryption key of the image storage device 100 and the encryption method received from the image storage device 100.

In the conventional technology, the image storage device decrypts the encrypted IP camera image stored in the memory and re-encrypts the decrypted IP camera image for transmission. However, according to the present disclosure, such a decryption and re-encryption process for transmitting the stored encrypted IP camera image is not performed, and thus the performance of the image storage device may be prevented from being degraded.

On the other hand, from a perspective of the client terminal, the client terminal decrypts an IP camera image not by using an encryption key possessed by the client terminal but by using an encryption key and an encryption method received from the image storage device through a security session and thus may decrypt and reproduce the IP camera images without degradation of the performance.

According to the implementation described above, the present disclosure is implemented such that an encryption key and an encryption method are managed not by the IP camera and the client terminal vulnerable to security but by the image storage device having robust security, thereby more securing the network segment security in the IP camera security system allowing secure encryption information to be transmitted.

In addition, the present disclosure transmits an encryption key and an encryption method through a security session separated from a data transport session for transmitting an encrypted image such that secure transmission of encryption information is achieved. In addition, the present disclosure does not perform encryption and decryption in the image storage device, and thus the performance of the image storage device is prevented from being degraded.

Figure 4:
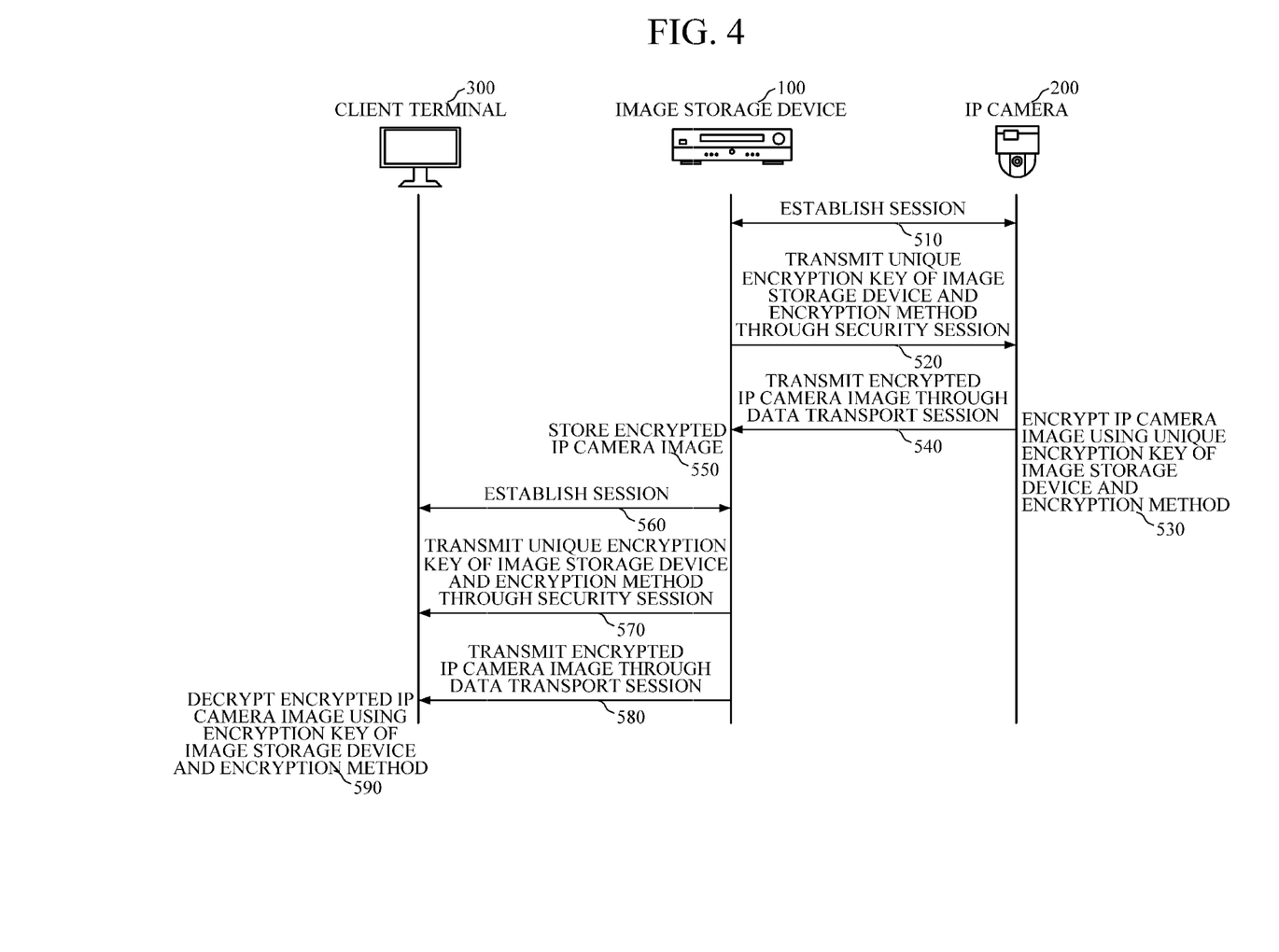
FIG. 4 is a flowchart showing an IP camera image encryption and transmission process in an IP camera security system allowing secure encryption information to be transmitted according to the present disclosure.

IP camera image encryption and transmission operations in the above-described IP camera security system allowing secure encryption information to be transmitted according to the present disclosure will be described with reference to FIG. 4. FIG. 4 is a flowchart showing an IP camera image encryption and transmission process in the IP camera security system allowing secure encryption information to be transmitted according to the present disclosure.

First, a session is established between the image storage device 100 and the IP camera 200 (510). In this case, a TLS session may be established between the image storage device 100 and the IP camera 200.

The session established between the image storage device 100 and the IP camera 200 may be divided into a security session for transmission of a unique encryption key of the image storage device and negotiation of an encryption method, and a data transport session for transmission of encrypted image data.

Then, the image storage device 100 transmits a unique encryption key of the image storage device 100 and an encryption method to the IP camera 200 through the security session (520). In this case, the unique encryption key of the image storage device 100 is an encryption key different from encryption keys of other image storage devices and may be a symmetric key based encryption key used for encryption and decryption of an image.

Meanwhile, the encryption method may include one of a full encryption method for encrypting the entire image, a partial encryption method for encrypting a portion of the entire image, or a NAL unit encryption method that performs encryption in a transmission unit of a NAL structure for data transport of the H.264 codec.

Then, the IP camera 200 encrypts an IP camera image using the unique encryption key of the image storage device and the encryption method received from the image storage device 100 (530).

The IP camera 200 transmits the IP camera image encrypted using the unique encryption key of the image storage device and the encryption method to the image storage device 100 through the data transport session (540).

Then, the image storage device 100 allows the encrypted IP camera image received from the IP camera 200 to be stored in the memory without being decrypted (550). In the conventional technology, an encrypted IP camera image received from an IP camera is decrypted by the image storage device and then is re-encrypted for storage.

However, according to the present disclosure, such a decryption and re-encryption process for storing the encrypted IP camera image is not performed, and thus the performance of the image storage device may be prevented from being degraded.

On the other hand, from a perspective of the IP camera, the IP camera may encrypt the IP camera image not using an encryption key possessed by the IP camera but using an encryption key received from the image storage device through the security session and thus may encrypt and transmit the IP camera image without degradation of the performance.

In this state, when the client terminal 300 accesses the image storage device 100 to request the IP camera image stored in the image storage device 100, a session is established between the image storage device 100 and the client terminal 300 (560). In this case, a TLS session may be established between the image storage device 100 and the client terminal 300.

The session established between the image storage device 100 and the client terminal 300 may be divided into a security session for transmission of a unique encryption key of the image storage device and negotiation of an encryption method and a data transport session for transmission of encrypted image data.

Then, the image storage device 100 transmits a unique encryption key of the image storage device 100 and an encryption method to the client terminal 300 through the security session (570). In this case, the unique encryption key of the image storage device is an encryption key different from encryption keys of other image storage devices and may be a symmetric key based encryption key used for encryption and decryption of an image.

Meanwhile, the encryption method may include one of a full encryption method for encrypting the entire image, a partial encryption method for encrypting a portion of the entire image, or a NAL unit encryption method that performs encryption in a transmission unit of a NAL structure for data transport of the H.264 codec, but the encryption method is not limited thereto.

Then, the image storage device 100 transmits the encrypted IP camera image, which is stored in the memory, to the client terminal 300 through the data transport session without being decrypted (580).

Then, the client terminal 300 decrypts the encrypted IP camera image received from the image storage device 100 using the encryption key of the image storage device 100 and the encryption method transmitted in operation 570 and reproduces the decrypted IP camera image (590).

In the conventional technology, the image storage device decrypts an encrypted IP camera image stored in the memory and re-encrypts the decrypted IP camera image for transmission. However, since the present disclosure does not perform the decryption and re-encryption process for transmitting the stored encrypted IP camera image, the performance of the image storage device may be prevented from being degraded.

On the other hand, from a perspective of the client terminal, the client terminal decrypts the IP camera image not by using an encryption key possessed by the client terminal but by using the encryption key and the encryption method received from the image storage device through the security session and thus may decrypt and reproduce the IP camera image without degradation of the performance.

According to the implementation described above, the present disclosure is implemented such that an encryption key and an encryption method are managed not by the IP camera and the client terminal vulnerable to security but by the image storage device having robust security, thereby further securing the security of the network segment in the IP camera security system allowing secure encryption information to be transmitted.

In addition, the present disclosure transmits an encryption key and an encryption method through a security session separated from a data transport session for transmitting an encrypted image such that secure transmission of encryption information is achieved. In addition, the present disclosure does not perform encryption and decryption in the image storage device, and thus the performance of the image storage device is prevented from being degraded.

As is apparent from the above, the present disclosure is implemented such that an encryption key and an encryption method are managed not by an IP camera and a client terminal vulnerable to security but by an image storage device having robust security, thereby further securing the network segment security.

The present disclosure transmits an encryption key and an encryption method through a security session separated from a data transport session for transmitting an encrypted image, thereby securing transmission of encryption information.

In addition, the present disclosure does not allow an image storage device to perform encryption and decryption, thereby preventing the performance of the image storage device from being degraded.

Although various embodiments of the present disclosure have been shown and described, the above description is for illustrative purposes to aid in the explanation and understanding of the present disclosure rather than intended to limit the scope of the embodiments of the present disclosure.

Thus, it should be appreciated by those skilled in the art that the present disclosure covers cover all modifications, equivalents, and alternatives falling within the spirit and scope of the present disclosure.

What is claimed is:

1. An internet protocol (IP) camera security system allowing secure encryption information to be transmitted, comprising:
   a plurality of IP cameras configured to capture a surveillance zone-specific IP camera image;
   at least one image storage device selectively connected to the plurality of IP cameras by a network and configured to receive and store the surveillance zone-specific IP camera image captured by each of the plurality of IP cameras; and
   at least one client terminal connected to the at least one image storage device by a network and configured to receive and reproduce the surveillance zone-specific IP camera images stored in the image storage device,
   wherein the image storage device comprises:

a memory in which a unique encryption key of the image storage device and an encryption method are stored;

a controller configured to establish a session to the IP camera or the client terminal;

an encryption information transmitter configured to transmit the unique encryption key of the image storage device and the encryption method stored in the memory to the IP camera or the client terminal, to which the session is established, through a security session;

an encrypted data receiver configured to receive the IP camera image encrypted using the unique encryption key of the image storage device and the encryption method transmitted by the encryption information transmitter from the IP camera through a data transport session; and an encrypted data storage controller by which the encrypted IP camera image received through the encrypted data receiver is stored in the memory without being decrypted, wherein the encryption information transmitter negotiates the encryption method with the IP camera through a transport layer security (TLS) session.

2. The IP camera security system of claim 1, wherein the image storage device further comprises an encrypted data transmitter configured to transmit the encrypted IP camera image stored in the memory without being decrypted to the client terminal through a data transport session such that the client terminal decrypts the encrypted IP camera image using the unique encryption key of the image storage device and the encryption method transmitted by the encryption information transmitter.

3. The IP camera security system of claim 1, wherein the IP camera discards the unique encryption key of the image storage device and the encryption method received from the image storage device when the session established to the image storage device is terminated.

4. The IP camera security system of claim 2, wherein the client terminal discards the unique encryption key of the image storage device and the encryption method received from the image storage device when the session established to the image storage device is terminated.

5. The IP camera security system of claim 1, wherein the encryption method includes one of a full encryption method, a partial encryption method, and a network abstraction layer (NAL) unit encryption method.

\* \* \* \* \*